United States Patent
Bender et al.

(10) Patent No.: US 9,309,706 B2
(45) Date of Patent: Apr. 12, 2016

(54) HINGE POCKET FOR GLASS WINDSHIELD

(71) Applicant: Taylor Made Group, LLC, Gloversville, NY (US)

(72) Inventors: Thomas J. Bender, Fort Wayne, IN (US); Brian Castleman, New Haven, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 14/476,161

(22) Filed: Sep. 3, 2014

(65) Prior Publication Data

US 2016/0060928 A1    Mar. 3, 2016

(51) Int. Cl.
*B60J 1/00* (2006.01)
*E05D 5/02* (2006.01)
*F16B 11/00* (2006.01)
*B60J 1/04* (2006.01)

(52) U.S. Cl.
CPC ............... *E05D 5/0246* (2013.01); *B60J 1/004* (2013.01); *B60J 1/04* (2013.01); *E05D 5/0207* (2013.01); *F16B 11/006* (2013.01); *E05D 2005/0269* (2013.01)

(58) Field of Classification Search
CPC ........ E05D 5/0246; E05D 5/0207; B60J 1/04; B60J 1/004
USPC .............................. 296/86, 88, 92, 77.1, 78.1
See application file for complete search history.

(56) References Cited

U.S. PATENT DOCUMENTS

| | | | |
|---|---|---|---|
| 1,842,005 A * | 1/1932 | Baia | ............................ 296/84.1 |
| 4,027,914 A | 6/1977 | Yamamoto et al. | |
| 4,615,556 A | 10/1986 | Stahel | |
| 5,203,277 A | 4/1993 | Norman | |
| 5,505,156 A | 4/1996 | Briggs | |
| 7,165,802 B1 | 1/2007 | Flynn | |
| 7,213,533 B2 | 5/2007 | Gonzales | |
| 7,665,792 B1 | 2/2010 | Flynn | |
| 7,673,923 B2 | 3/2010 | Reese | |

* cited by examiner

*Primary Examiner* — Joseph D Pape
(74) *Attorney, Agent, or Firm* — Nixon & Vanderhye P.C.

(57) ABSTRACT

A hinge system for a glass windshield with a receiving cut includes a protective flange with an opening therein secured adjacent the receiving cut on one side of the glass windshield. A stiffener is positioned adjacent the receiving cut on an opposite side of the glass windshield. A hinge member including a hinge tab is disposed in the opening of the protective flange and is secured to the stiffener.

14 Claims, 2 Drawing Sheets

HINGE POCKET FOR GLASS WINDSHIELD

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates generally to a hinge assembly for a glass windshield and, more particularly, to simplified structure for mounting a hinge assembly to a glass windshield.

It is desirable to include a hinge section in a windshield or other glass structure so that a portion of the windshield or glass structure can be folded out. With existing assemblies, however, it is typically required to encapsulate the edge of the window receiving the hinge with polyurethane in order to mount a hinge. The process required for applying the polyurethane can be burdensome, and the tooling for installing the hinge assembly can be expensive. Existing structures typically also require drilling holes through laminated glass, which is a tedious process. Still further, existing hinge assemblies are difficult to replace if damaged or worn, and the footprint of existing assemblies tends to obstruct the view through the windshield.

BRIEF SUMMARY OF THE INVENTION

It would thus be desirable to provide a hinge assembly that overcomes the drawbacks associated with existing structures. The hinge assembly according to preferred embodiments is cooperable with a cut-out portion of the windshield that eliminates the need for drilling/aligning holes in the glass windshield. The proposed structure protects the glass edge from the cast steel hinge, yet still provides adequate clamping of the glass for assembly integrity and robustness. The arrangement also allows for replacing a hinge due to damage or wear.

In an exemplary embodiment, a hinge system is provided for a glass windshield including a receiving cut. The hinge system includes a protective flange with an opening therein secured adjacent the receiving cut on one side of the glass windshield and a stiffener positioned adjacent the receiving cut on an opposite side of the glass windshield. A hinge member including a hinge tab is disposed in the opening of the protective flange and is secured to the stiffener. An adhesive may secure the protective flange to the glass windshield. In this context, the protective flange may include a channel on a side thereof facing the glass windshield, where the adhesive is disposed in the channel. The hinge tab may be shaped corresponding to the opening in the protective flange. A connector may extend through the stiffener and into the hinge tab. In one embodiment, the stiffener is formed of aluminum or steel. An adhesive may secure the stiffener to the glass windshield.

In another exemplary embodiment, a windshield assembly includes a glass windshield that is pivotable between a first position and a second position by the exemplary hinge assembly. In this embodiment, the glass windshield may be a laminated glass windshield.

In yet another exemplary embodiment, a method of assembling a hinge assembly onto a glass windshield includes the steps of (a) securing a protective flange adjacent the receiving cut on one side of the glass windshield, the protective flange including an opening therein; (b) positioning a stiffener adjacent the receiving cut on an opposite side of the glass windshield; (c) positioning a hinge tab of a hinge member in the opening of the protective flange; and (d) securing the hinge member to the stiffener.

BRIEF DESCRIPTION OF THE DRAWINGS

These and other aspects and advantages will be described in detail with reference to the accompanying drawings, in which.

DETAILED DESCRIPTION OF THE INVENTION

Figure 3:
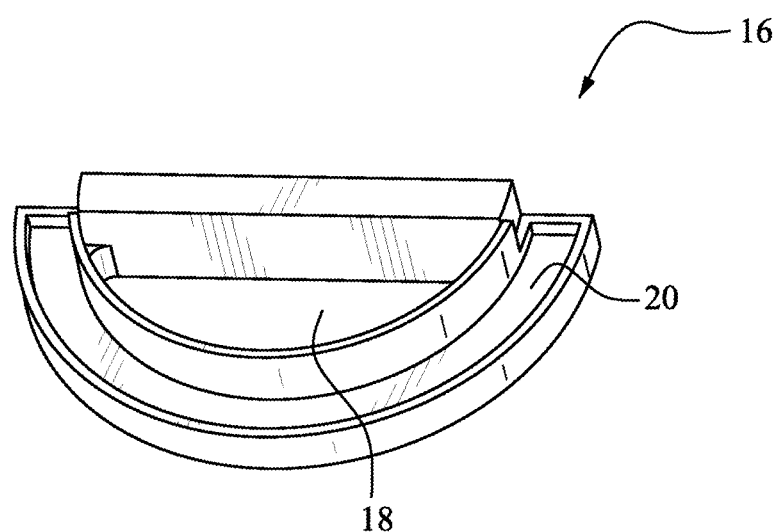
FIG. 3 is a back side view of the protective flange.

With reference to the drawings, a hinge system 10 is provided for a glass windshield 12. The glass windshield 12, which may be a laminated glass windshield, includes a receiving cut 14 therein, which may be a semispherical cut or the like, made during the manufacture of the glass 12. A protective flange 16 includes an opening 18 therein and is secured adjacent the receiving cut 14 on one side of the glass windshield 12. In preferred embodiments, the protective flange 16 is formed of plastic or other suitable material. The protective flange 16 may be injection molded. With reference to FIG. 3, the protective flange 16 may include a channel 20 on a side thereof that faces the glass windshield 12. The channel 20 receives an adhesive for securing the protective flange 16 to the glass windshield 12.

Figure 1:
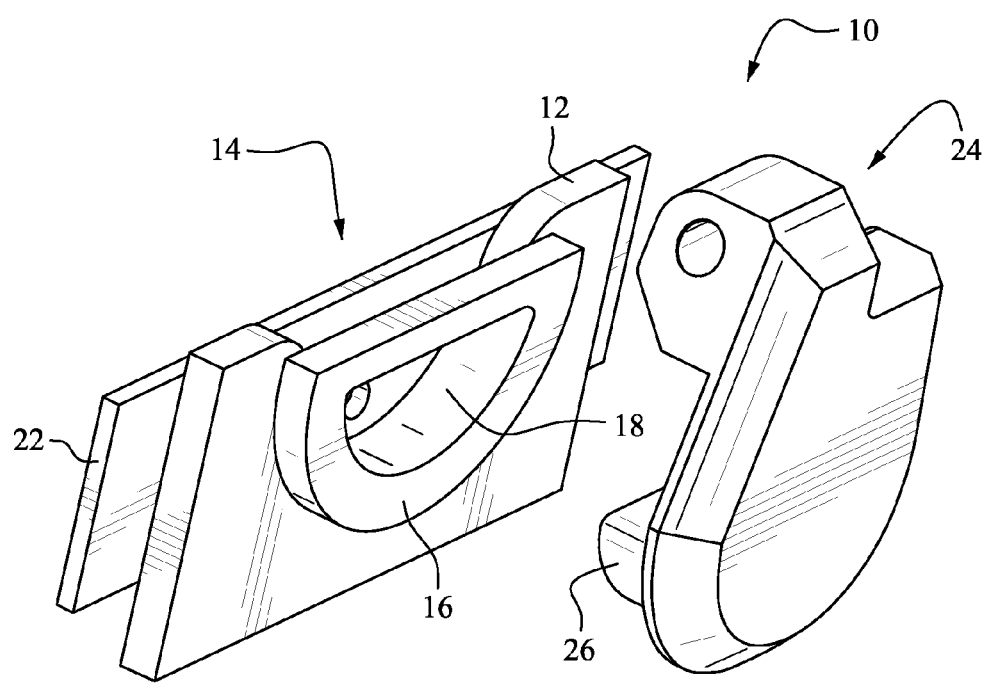
FIG. 1 is a front perspective view of the windshield and hinge assembly according to preferred embodiments.
Figure 2:
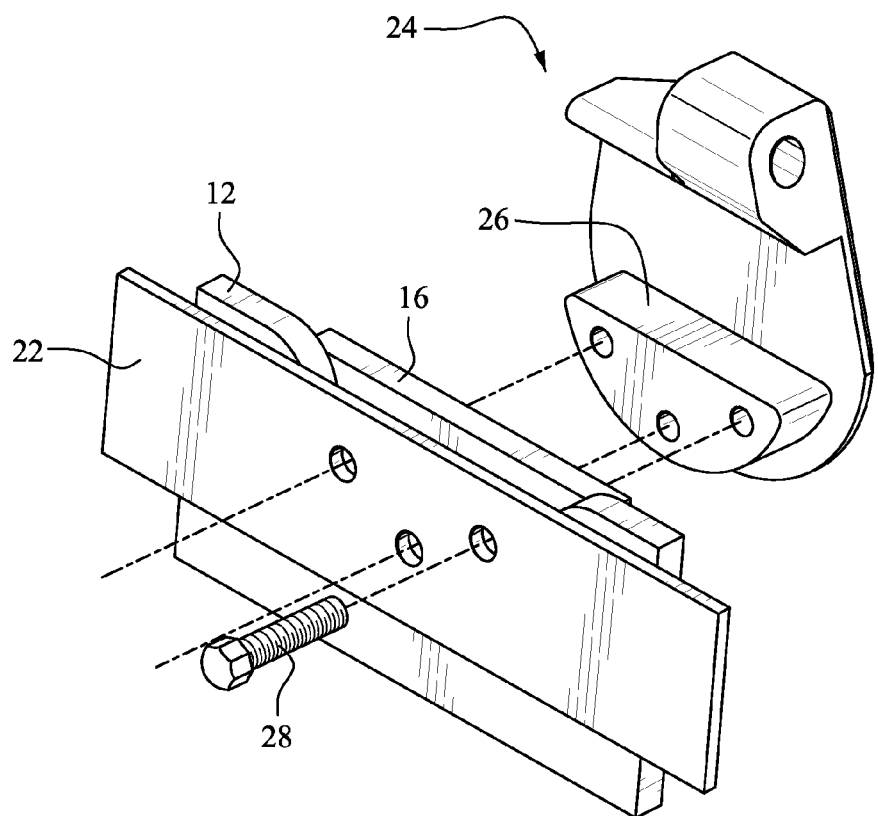
FIG. 2 is a rear perspective view of the assembly.

A stiffener 22 is positioned adjacent the receiving cut 14 on an opposite side of the glass windshield 12 as shown in FIGS. 1 and 2. The stiffener 22 is preferably formed of aluminum or steel or other suitable material and is bonded to the glass 12 by an adhesive or the like.

The hinge system also includes a hinge member 24 with a hinge tab 26 positionable through the opening 18 of the protective flange 16. The hinge member 24 may cast steel or other suitable material. The hinge tab 26 is secured to the stiffener 22 via a suitable connector. A connector 28 such as a screw or the like extends through the stiffener 22 and into the hinge tab 26. In an exemplary embodiment, the hinge tab 26 is provided with three apertures that are aligned with corresponding apertures in the stiffener 22, and connectors 28 extend through each of the apertures in the stiffener 22 into the apertures in the hinge tab 26. As shown in FIGS. 1 and 2, the hinge tab 26 is generally shaped corresponding to a shape of the opening 18 in the protective flange 16.

The hinge 24 is dimensioned so that, during the tightening of the hardware, a slight compression of all components takes place between the hinge 24 and the stiffener 22. When tightening is complete, the hinge tab 26 of the hinge 24 rests against the stiffener 22. The protective flange 16 protects the glass edge from the hinge 24, yet still provides adequate clamping of the glass for assembly integrity and robustness.

The hinge mounting system and hinge assembly facilitates replacement of the hinge if it becomes damaged or worn. Additionally, due to its relatively small footprint, the view through the windshield is less obstructed. The assembly eliminates the need for drilling/aligning holes in a glass windshield.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A hinge system for a glass windshield, the glass windshield including a receiving cut, the hinge system comprising:
   a protective flange including an opening therein secured adjacent the receiving cut on one side of the glass windshield;
   a stiffener positioned adjacent the receiving cut on an opposite side of the glass windshield;
   a hinge member including a hinge tab disposed in the opening of the protective flange and secured to the stiffener; and
   a connector extending through the stiffener and into the hinge tab.

2. A hinge system according to claim 1, further comprising an adhesive securing the protective flange to the glass windshield.

3. A hinge system according to claim 2, wherein the protective flange comprises a channel on a side thereof facing the glass windshield, and wherein the adhesive is disposed in the channel.

4. A hinge system according to claim 1, wherein the hinge tab is shaped corresponding to the opening in the protective flange.

5. A hinge system according to claim 1, wherein the stiffener is formed of aluminum or steel.

6. A hinge system according to claim 1, further comprising an adhesive securing the stiffener to the glass windshield.

7. A windshield assembly comprising:
   a glass windshield that is pivotable between a first position and a second position by a hinge assembly, the glass windshield including a receiving cut, wherein the hinge assembly comprises:
   a protective flange including an opening therein secured adjacent the receiving cut on one side of the glass windshield,
   a stiffener positioned adjacent the receiving cut on an opposite side of the glass windshield, and
   a hinge member including a hinge tab disposed in the opening of the protective flange and secured to the stiffener.

8. A windshield assembly according to claim 7, wherein the hinge tab is shaped corresponding to the opening in the protective flange.

9. A windshield assembly according to claim 7, further comprising a connector extending through the stiffener and into the hinge tab.

10. A windshield assembly according to claim 7, wherein the stiffener is formed of aluminum or steel.

11. A windshield assembly according to claim 7, wherein the glass windshield is a laminated glass windshield.

12. A method of assembling a hinge assembly onto a glass windshield including a receiving cut, the method comprising:
   (a) securing a protective flange adjacent the receiving cut on one side of the glass windshield, the protective flange including an opening therein;
   (b) positioning a stiffener adjacent the receiving cut on an opposite side of the glass windshield;
   (c) positioning a hinge tab of a hinge member in the opening of the protective flange; and
   (d) securing the hinge member to the stiffener,
   wherein step (c) is practiced by extending the hinge tab through the opening of the protective flange and through the receiving cut, and wherein step (d) is practiced by extending a connector through the stiffener and into the hinge tab.

13. A method according to claim 12, wherein step (a) is practiced by bonding the protective flange to the glass windshield.

14. A method according to claim 12, wherein step (b) is practiced by bonding the stiffener to the glass windshield.

* * * * *